United States Patent
Toldy et al.

[15] 3,671,537
[45] June 20, 1972

[54] CERTAIN 3-(2,6-DICHLOROPHENYL)-2-IMINOTHIAZOLIDINES

[72] Inventors: Lajos Toldy; Jozsef Borsi; Sandor Elek; Istvan Elekes; Ferenc Andrasi, all of Budapest, Hungary

[73] Assignee: Gyogyszerkutato Intezet, Budapest, Hungary

[22] Filed: June 1, 1970

[21] Appl. No.: 42,462

[30] Foreign Application Priority Data

June 5, 1969 Hungary.................................GO-1096

[52] U.S. Cl..............................260/306.7, 424/200, 424/270
[51] Int. Cl. .........................................................C07d 91/18
[58] Field of Search................................................260/306.7

Primary Examiner—Alex Mazel
Assistant Examiner—R. J. Gallagher
Attorney—Young and Thompson

[57] ABSTRACT

New thiazolidine derivatives of the general formula I

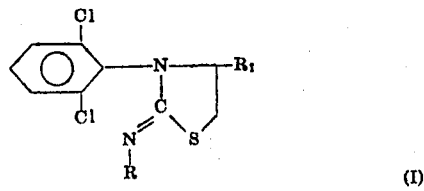

wherein R is an alkyl-group having from one to five carbon atoms, and $R_1$ is hydrogen, methyl, ethyl and hydroxymethyl groups, and their acid addition salts formed with non-toxic acids. The compounds show a special effect on the central nervous system.

3 Claims, No Drawings

CERTAIN 3-(2,6-DICHLOROPHENYL)-2-IMINOTHIAZOLIDINES

This invention relates to new derivatives of thiazolidine and their acid-addition salts. The invention also relates to a new process for preparing thiazolidines of this type.

2-substituted-imino-3-phenyl-thiazolidines are known from the technical literature (R. Andreasch, Monatshefte 4, 131 /1883/; F. Kucera, Monatshefte 35, 137 /1914/; L. Dashen and R.Q. Brewter, Trans. Kansas Acad. Sci. 40, 103 /1937/). These compounds are prepared by reacting 1,3-disubstituted thioureas with 1,2-dibromethane.

We have found that the new thiazolidine derivatives having the general formula I

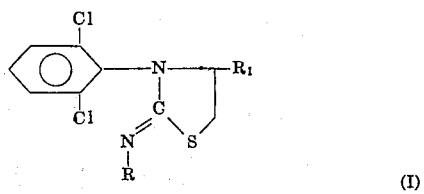

have valuable therapeutical properties. In the general formula I R stands for alkyl having from one to five carbon atoms and $R_1$ is selected from the group consisting of hydrogen, methyl, ethyl and hydroxymethyl groups.

The invention includes all the stereoisomers and stereoisomeric mixtures of the compounds having the general formula I.

According to the present invention the compounds of the general formula I are prepared by reacting a compound of the general formula II

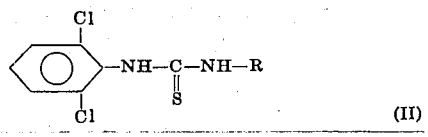

wherein R has the same meanings as above, with dihalogenides having the general formula III $$\text{Hal} - \text{X} - \text{Hal} \quad \text{(III)}$$

wherein Hal stands for halogen and X stands for unsubstituted ethylene or ethylene substituted with methyl, ethyl or hydroxy-methyl group. Thus X may stand for groups: $-CH_2-CH_2-$,

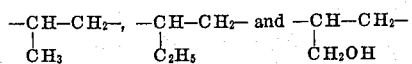

The dihalogenide of formula III is advantageously a chlorine, bromine or iodine derivative, such as 1,2-dibromethane-, 1,2-dibromopropane, 1,2-dibromobutane and 1,2-dibromopropanol-3.

The compounds of the general formula III are used at least in an equimolar ratio in relation to the thioureas of formula II. The preferable amount is 2 – 8 moles to 1 mole of thiourea.

The reaction is preferably carried out in the dihalogenides of the general formula III as solvents, at the boiling point of the mixture. Other solvents, such as aliphatic alcohols containing from two to five carbon atoms, e.g. aethanol, n-butanol, or isoamylalcohol, may also be used.

The compounds of the general formula I possess basic properties and can form acid addition salts. If it is desired to obtain the acid addition salt from the free base, this salt can be prepared by reacting the free base with an inorganic or organic acid, such as hydrochloric, hydrobromic, maleic, fumaric, ethane sulphonic, sulphuric, phosphoric, nitric, acetic, lactic, citric and other pharmaceutically acceptable acid, preferably in the presence of a suitable solvent permitting isolation of the salt.

On the other hand, if it is desired to convert the acid addition salt to the free base, this can be accomplished by dissolving the salt in a suitable solvent, neutralizing the solution with a base, such as sodium hydroxide, and isolating the desired free base by extraction of other suitable means.

The haloid salts obtained of the compounds of formula I are generally separated from the reaction mixture in crystalline form. After separating, these salts can be transformed into the corresponding free base in the above-described way, and the thus-obtained raw base can be purified e.g. by recrystallization or column cromatography, whereafter, if desired, the base is transformed into a pharmaceutically acceptable acid addition salt.

The thiocarbamides of general formula II are new compounds. They can be prepared by reacting 2,6-dichloro-phenyl-isothiocyanate with amines of formula $R-NH_2$, wherein R has the same meanings as above.

The compounds of the general formula I possess valuable pharmacological properties. Thus, due to their specific effect on the central nervous system, they enhance the stimulating effect exerted by strychnine on the spinal reflexes, without having per se convulsive properties. Data proving this statement are summarized in Tables I and II.

TABLE I

Potentioning the convulsive effect of strychnine on mice with 2-methylimino-3-(2,6-dichlorophenyl)-4-methyl-thiazolidine

| Dose i.p. mg/kg | Number of animals | Average time of infusion sec. | Average amount of strychnine introduced ml. |
|---|---|---|---|
| Control | 30 | 64.4 | 0.402 |
| 3.125 | 30 | 57.3 | 0.358 |
| 6.25 | 30 | 50.5 | 0.316 |
| 12.5 | 30 | 41.9 | 0.262 |

In the tests given in Table I, the concentration of the strychnine infusion solution was 50 $\mu$g./ml. and the rate of infusion amounted to 0.375 ml. pro sec.

On the basis of Table I it appears that under the influence of the pretreatment with 2-methylimino-3-(2,6-dichlorophenyl)-4-methyl-thiazolidine, the time of intravenous infusion of the standard strychnine solution and the amount of strychnine necessary for causing convulsions decreased with the increase of the dose.

The potentioning of the convulsive effect of strychnine was verified on rats in such a way that at first, on the basis of the curve dose against effect of the drug, the 30 percent convulsive dose of strychnine nitrate was determined; in case of intraperitoneal treatment this dose turned out to be 1.5 mg/kg.

After an intraperitoneal pretreatment with different doses of the compounds according to the invention, this dose of strychnine has been added and the number of animals having convulsions has been registered. The results are given in Table II.

Table II

Enhancing the convulsive effect of strychnine nitrate on rats (Standard i.p. dose of strychnine: 1.5 mg/kg)

| Compound | Dose i.p. mg./kg. | Number of animals | Animals subjected to convulsions % |
|---|---|---|---|
| Control | | 100 | 30.0 |
| Compound 1 | 2.5 | 12 | 50.0 |
| | 5.0 | 12 | 75.0 |
| | 10.0 | 12 | 75.0 |
| | 20.0 | 12 | 91.6 |
| Compound 2 | 5.0 | 12 | 58.2 |
| | 10.0 | 12 | 75.0 |
| | 20.0 | 12 | 83.4 |

Compound 1 = 2-methylimino-3-(2,6-dichlorophenyl)-4-methyl-thiazolidine
Compound 2 = 2-methylimino-3-(2,6-dichlorophenyl)-4-hydroxy-methyl-thiazolidine A further interesting effect of the compounds of general formula I is that they antagonize the effect of the pharmacons inhibiting the interneuronal reflexes. This effect was measured on mice with the "Rota-rod" test (Gross et al., Schweiz. Med. Wochenschr. 85, 305 /1955/), whereby it has been shown that in case of pretreatment with the compounds according to the invention, the muscle-relaxing effect of the polysynaptic reflex inhibiting N-isopropyl-2-methyl-2-propyl-1,3-propanediol-dicarbonate (Carisoprodol) significantly decreased. Data concerning this effect are given in Table III.

The Carisoprodol has been injected 10 minutes after the s.c. treatment.

Table III

The antagonizing effect of compound 1 on the muscle relaxation induced by Carisoprodol on mice

| Number of animals | Treatment | Dose mg/kg | Mode of treatment | Number of relaxed animals in %* |
|---|---|---|---|---|
| 50 | Phys.NaCl<br>+<br>Carisoprodol | 0,1 ml/10g.<br><br>100.0 | s.c.<br><br>i.p. | 70 |
| 50 | Compound 1<br>+<br>Carisoprodol | 1.0<br><br>100.0 | s.c.<br><br>i.p. | 40 |
| 50 | Compound 1<br>+<br>Carisoprodol | 3.0<br><br>100.0 | s.c.<br><br>i.p. | 26 |

* 10 minutes following the last application of the drug, the muscle-relaxing effect was measured within 2 minutes.

On the basis of the above data it can be seen that the compounds according to the invention show a special psychotonic effect.

The compounds of the general formula I are readily resorbed from the gastro-intestinal tract and their pharmacological effects are developed also when administered perorally. The compound 1 labelled with $^{14}C$ can be detected in the blood within some minutes after a 30 mg./kg. peroral administration on rats; its maximum value appears 2 hours following the administration; at this time the average value of the blood level was 14 $\mu$g./ml. On the basis of investigations carried out with compound 1 one can infer to the fact that the compound gets through the blood-liquor barrier, it reaches the cerebrum and after injecting an i.p. dose of 10 mg./kg. it shows a maximum value of 3.1 gamma/g. at the 15th minute. The compound leaves the organism relatively quickly; thus it is not cumulated. The good resorption can be judged also from the fact that about 60 percent of a perorally administered dose leaves with the urine within 24 hours.

The acute toxicity of compounds 1 and 2 on mice is shown in Table IV.

TABLE IV

Acute $LD_{50}$ values on mice

| Compound | $LD_{50}$ values in case of | |
|---|---|---|
| | p.o. treatment | i.p. treatment |
| 2-Methylimino-3-<br>-(2,6-dichlorophenyl)-<br>-4-methyl-thiazolidine | 120 | 55.0 |
| 2-Methylimino-3-<br>-(2,6-dichlorophenyl)-<br>-4-hydroxymethyl-thiazolidine | 250 | 80.0 |

On the basis of the acute $LD_{50}$ values it can be stated that the compounds according to the invention are relatively slightly toxic; at the same time, the small difference between the parenteral and peroral doses is a further proof of the fact that the compounds are readily resorbed from the gastro-intestinal tract.

According to a further feature of the present invention there are provided pharmaceutical compositions comprising as active ingredients at least one compound of the general formula I, wherein R and $R_1$ have the same meanings as above, in admixture with suitable pharmaceutical carriers and/or excipients.

These pharmaceutical compositions may be solid, e. g. tablets, pills, coated pills, suppositories, capsules, or liquid, such as solutions, suspensions, emulsions or injectable preparations. The compositions may be suitable for oral, rectal or parenteral administration.

The carriers may be conventional organic or inorganic substances, such as starch, magnesium stearate, talk, stearine, water, polyalkylene glycols, magnesium carbonate etc.

The pharmaceutical compositions may contain additives, such as emulsifying, stabilizing, disintegrating and wetting agents etc. The preparations may comprise in addition to the compound of formula I further therapeutically active compounds.

The pharmaceutically compositions of the present invention can be prepared by usual methods known per se of the pharmaceutical industry, by admixing the active ingredient with suitable solid or liquid organic or inorganic pharmaceutical carriers and/or excipients and, if desired, with other therapeutically active compounds.

The compounds according to the invention and their method of preparation are further illustrated by the aid of the following examples.

Example 1

20 g. 1-(2,6-dichlorophenyl)-3-methyl-thiourea are boiled with 20 ml. of 1,2-dibromopropane and 20 ml. of isoamylalcohol. After cooling, the precipitate formed is sucked and washed with dibromethane and then with dry ether. The thus-obtained 16 g. of 2-methylimino-3-(2,6-dichlorophenyl)-4-methyl-thiazolidine hydrobromide are dissolved in 70 ml. of hot water, clarified with charcoal and the solution is rendered alkaline with aqueous ammonia. The product precipitated is taken up with chloroform, whereafter the solvent is distilled off. The thus-obtained 2-methylimino-3-(2,6-dichlorophenyl)-4-methyl-thiazolidine melts at 66° – 69° C.

The 1-(2,6-dichlorophenyl)-3-methyl-thiourea can be prepared by reacting 2,6-dichlorophenyl-isothiocyanate with methylamine; m.p. 181°–183° C.

EXAMPLE 2

35 g. of 1-(2,6-dichlorophenyl)-3-methyl-thiourea are boiled for 20 hours with 35 ml. of 1,2-dibromopropanol-3 and 35 ml. of isoamylalcohol. After cooling 35 ml. of dry ether are added to the mixture. The precipitate formed is sucked and washed with dibromethane and then with dry ether. The thus-obtained 25 g. of 2-methylimino-3-(2,6-dichlorophenyl)-4-hydroxymethyl-thiazolidine hydrobromide are dissolved in 600 ml. of hot water, clarified with charcoal and rendered alkaline with concentrated aqueous ammonia. The thus-formed 2-methylimino-3-(2,6-dichlorophenyl)-4-hydroxymethyl-thiazolidine melts, after recrystallizing from absolute alcohol, at 188°–190° C.

What we claim is:

1. A thiazolidine derivative selected from the group consisting of a compound of the formula

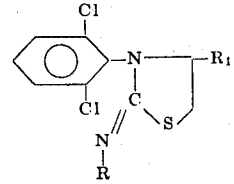

wherein R is an alkyl-group having from one to five carbon atoms, and $R_1$ is selected from the group consisting of hydrogen, methyl, ethyl and hydroxymethyl, and an acid addition salt thereof formed with a non-toxic acid.

2. A compound as claimed in claim 1, wherein the acid addition salt is a member selected from the group consisting of hydrochloride, hydrobromide, maleate, fumarate, ethane-sulphonate, sulphate, nitrate, phosphate, acetate, citrate and lactate.

3. A compound as claimed in claim 1, selected from the group consisting of 2-methylimino-3-(2,6-dichlorophenyl)-4-methyl-thiazolidine, 2-methylimino-3-(2,6-dichlorophenyl)-4-hydroxymethyl-thiazolidine, and their non-toxic acid-addition salts.

* * * * *